(12) United States Patent  (10) Patent No.: US 8,674,879 B2
Nilsson et al.  (45) Date of Patent: Mar. 18, 2014

(54) ANTENNA ARRANGEMENT FOR DOA ESTIMATION

(75) Inventors: Andreas Nilsson, Goteborg (SE);
Fredrik Athley, Kullavik (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/453,364

(22) Filed: Apr. 23, 2012

(65) Prior Publication Data

US 2013/0278463 A1  Oct. 24, 2013

Related U.S. Application Data

(63) Continuation of application No. PCT/EP2012/057070, filed on Apr. 18, 2012.

(51) Int. Cl.
*G01S 3/74* (2006.01)
*G01S 3/22* (2006.01)

(52) U.S. Cl.
CPC .... *G01S 3/74* (2013.01); *G01S 3/22* (2013.01)
USPC .......................................... 342/417; 342/441

(58) Field of Classification Search
CPC ..................................... G01S 3/74; G01S 3/22
USPC .................. 342/417, 432, 437, 440, 441, 445
See application file for complete search history.

(56) References Cited

U.S. PATENT DOCUMENTS

| 4,634,230 | A | * | 1/1987 | Spezio | 359/311 |
| H000292 | H | * | 6/1987 | Klose et al. | 342/394 |
| 5,465,097 | A | * | 11/1995 | Fry | 342/442 |
| 5,724,047 | A | * | 3/1998 | Lioio et al. | 342/442 |
| 6,377,213 | B1 | | 4/2002 | Odachi et al. | |
| 2007/0200760 | A1 | * | 8/2007 | Hjelmstad | 342/417 |
| 2012/0098694 | A1 | * | 4/2012 | Hansen | 342/154 |

FOREIGN PATENT DOCUMENTS

WO  99/40687 A1  8/1999

OTHER PUBLICATIONS

Ibrahim Tekin et al. "Simultaneous Frequency and direction Finding Technique Using Frequency Scanning Antenna" Proceedings of the European Microwave Conference, Espoo, Finland, Aug. 24-27, 1992, vol. 1, pp. 654-658.
Notification of Transmittal of the International Search Report and The Written Opinion of the International Searching Authority, or the Declaration issued on Feb. 26, 2013 in corresponding International Application No. PCT/EP2012/057070, 13 pages.
PCT/EP2012/057070, Published Application dated Oct. 24, 2013, 25 pages.

* cited by examiner

*Primary Examiner* — Gregory C Issing
(74) *Attorney, Agent, or Firm* — Rothwell, Figg, Ernst & Manbeck, P.C.

(57) ABSTRACT

An antenna arrangement including at least two antenna functions arranged to cover a certain angular sector, each antenna function comprising a corresponding antenna port. The antenna arrangement is configured to perform: a first direction of arrival (DOA) estimation for a transmitting device at a first frequency, and a second DOA estimation for the transmitting device at a second frequency, wherein the second frequency has a larger magnitude than the first frequency, and wherein at least one second frequency grating lobe is apparent in the angular sector at the second frequency. The antenna arrangement is configured to: distinguish the at least one second frequency grating lobe from a second frequency main lobe using results from the first DOA estimation, and identify a pointing direction of the second frequency main lobe as a resulting DOA estimation. Related methods are also described.

11 Claims, 5 Drawing Sheets

ANTENNA ARRANGEMENT FOR DOA ESTIMATION

CROSS-REFERENCE TO RELATED APPLICATION(S)

This application is a continuation of International Application No. PCT/EP2012/057070, filed Apr. 18, 2012. The patent application identified above is incorporated herein in its entirety by reference.

TECHNICAL FIELD

The present invention relates to an antenna arrangement comprising at least two antenna functions arranged to cover a certain angular sector. Each antenna function comprises a corresponding antenna port. The antenna arrangement is arranged to perform a first direction of arrival (DOA) estimation for a transmitting device at a first frequency.

The present invention also relates to a method for estimating direction of arrival, (DOA) for a transmitting device, the method comprising the step of performing a first DOA estimation for the transmitting device at a first frequency.

BACKGROUND

In LTE (Long Term Evolution) advanced, wider bandwidth is achieved by aggregating component carriers either contiguously or non-contiguously. The component carriers are backward compatible with the ones defined in LTE Rel-8. For contiguous carrier aggregation, consecutive spectrum is aggregated. On the other hand, discontiguous bands are accumulated for non-contiguous carrier aggregation.

Finding the positions of user terminals in a communication system has been in focus for some time, one example includes the use of the GPS (Global Positioning System) in the user terminal. Another way is to use DOA (Direction Of Arrival) estimations at the base stations. With help of the DOA estimations, the direction of the user terminal with respect of the base station could be found. The knowledge of the direction of the user terminal could then be combined with the knowledge of the time delay between the base station ant the user terminal to find the position of the user terminal. By combining DOA estimations from several base stations, the user terminal positions can also be found by means of triangulation. The DOA estimation is typically done in base stations by using sounding signals transmitted from the user terminals.

However, existing solutions can still be improved such that the DOA can be estimated with higher accuracy.

There is thus a need for estimation of DOA with higher accuracy then is provided by means of existing solutions.

SUMMARY

It is an object of the present invention to provide estimation of DOA with higher accuracy then is provided by means of existing solutions.

Said object is obtained by means of an antenna arrangement comprising at least two antenna functions arranged to cover a certain angular sector. Each antenna function comprises a corresponding antenna port. The antenna arrangement is arranged to perform a first direction of arrival (DOA) estimation for a transmitting device at a first frequency. The antenna arrangement is furthermore arranged to perform a second DOA estimation for the transmitting device at a second frequency, where the second frequency is of larger magnitude than the first frequency. At least one second frequency grating lobe is apparent in the angular sector at the second frequency. The antenna arrangement is arranged to separate said second frequency grating lobe from a second frequency main lobe by means of results from the first DOA estimation. A pointing direction of the second frequency main lobe forms a resulting DOA estimation.

Said object is also obtained by means of a method for estimating direction of arrival, (DOA) for a transmitting device, the method comprising the step of performing a first DOA estimation for the transmitting device at a first frequency. The method further comprises the steps:

performing a second DOA estimation for the transmitting device at a second frequency, the second DOA estimation resulting in at least one second frequency grating lobe and a second frequency main lobe;

separating said second frequency grating lobe from the second frequency main lobe using results from the first DOA estimation; and forming a resulting DOA estimation from the pointing direction of the second frequency main lobe.

The second frequency is of larger magnitude than the first frequency.

According to an example, the first DOA estimation results in a first frequency main lobe. The antenna arrangement is arranged to separate said second frequency grating lobe from the second frequency main lobe by means of comparison between, on one hand, a pointing direction of the first frequency main lobe and, on the other hand, corresponding pointing directions of the second frequency main lobe and said second frequency grating lobes, where the respective main lobes have the same pointing direction.

Alternatively, the first DOA estimation results in a first frequency main lobe and at least one first frequency grating lobe. The antenna arrangement is arranged to separate said second frequency grating lobe from the second frequency main lobe by comparison between, on one hand, corresponding pointing directions of the first frequency main lobe and said first frequency grating lobe and, on the other hand, corresponding pointing directions of the second frequency main lobe and said second frequency grating lobe, where the respective main lobes have the same pointing direction.

According to another example, the antenna arrangement is comprised in a wireless communication system node, the node in turn comprising at least two antenna arrangements. Each antenna arrangement is intended to cover a certain angular sector.

According to another example, the antenna ports are connected to a beamforming device. In this case, beamforming is used at the DOA estimation.

More examples are disclosed in the dependent claims.

A number of advantages are obtained by means of the present invention; mainly it enables accurate and non-ambiguous DOA estimations.

BRIEF DESCRIPTION OF THE DRAWINGS

The present invention will now be described more in detail with reference to the appended drawings, where.

DETAILED DESCRIPTION

Figure 1:
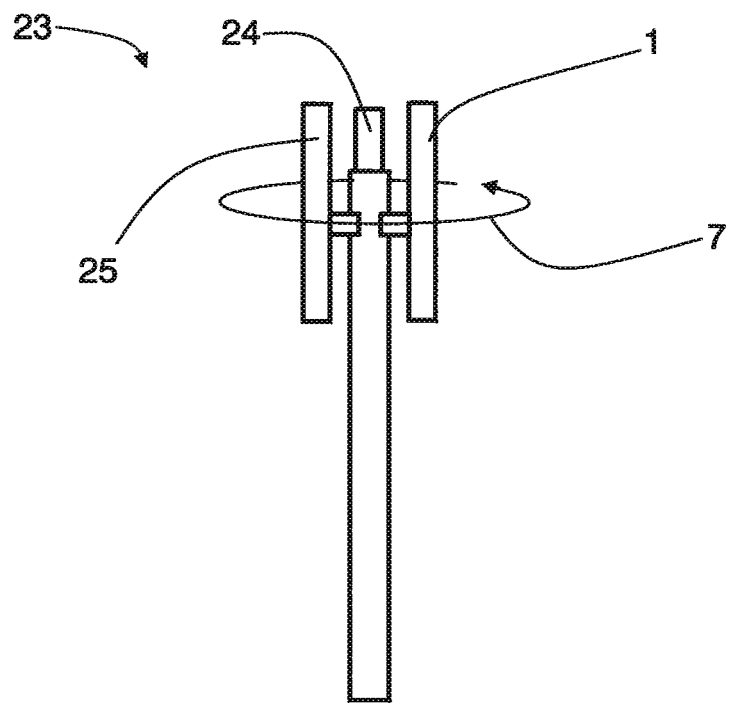
FIG. 1 shows a schematic side view of a node.
Figure 2:
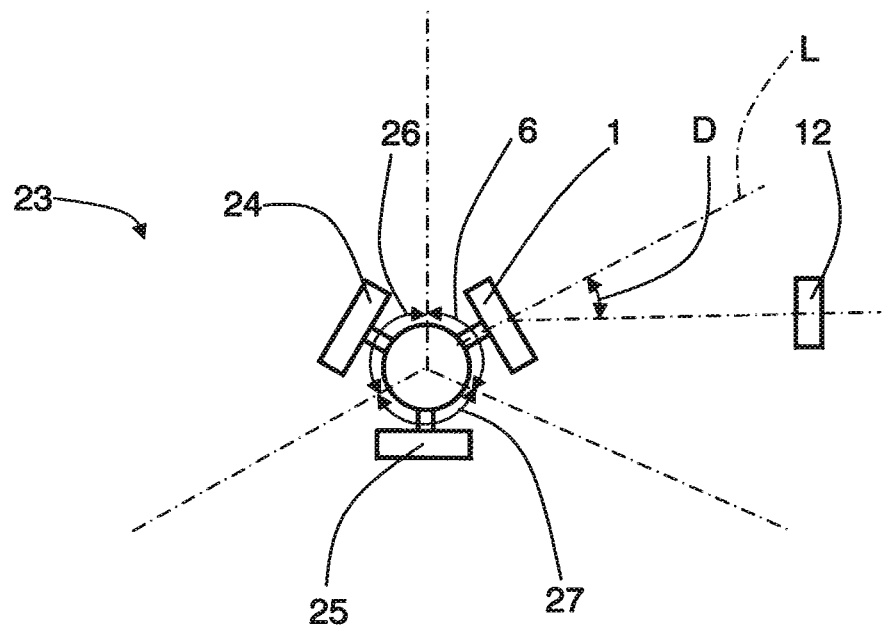
FIG. 2 shows a schematic top view of the node.

With reference to FIG. 1 and FIG. 2, there is a wireless communication system node 23, the node 23 in turn comprising a first antenna arrangement 1, a second antenna arrangement 24, and a third antenna arrangement 25. Each antenna arrangement 1, 24, 25 is intended to cover a certain corresponding angular sector 6, 26, 27. The angular sectors 6, 26, 27 are shown in an azimuth plane 7, and have a respective angular span.

The antenna arrangement 1 is arranged to perform direction of arrival, DOA, estimations for a transmitting device 12 being positioned in a certain angular direction D with respect to a reference line L.

Figure 3:
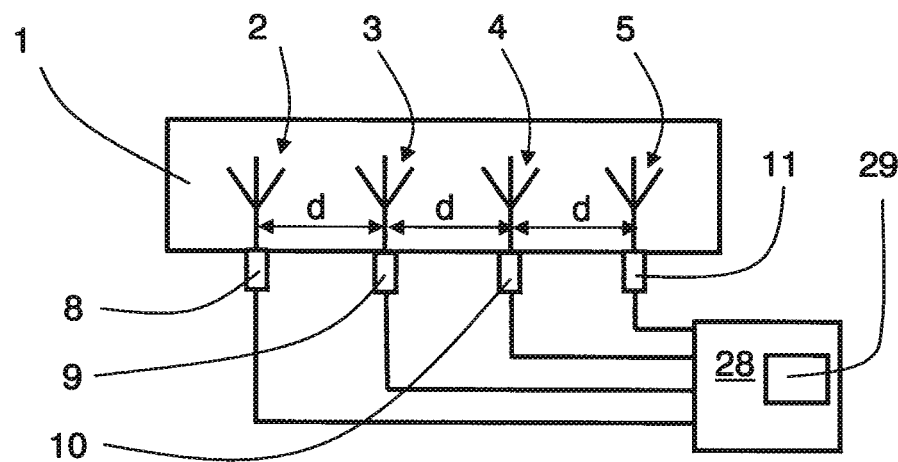
FIG. 3 shows a schematic view of an antenna arrangement.

In the following, the first antenna arrangement 1 will be described more in detail with reference to FIG. 3, the other antenna arrangements 24, 25 being of similar design. The first antenna arrangement 1 comprises four antenna functions 2, 3, 4, 5 arranged to cover the angular sector 6, each antenna function 2, 3, 4, 5 comprising a corresponding antenna port 8, 9, 10, 11.

The DOA estimations are here performed by means of beamforming. For this purpose, the antenna ports 8, 9, 10, 11 are connected to a beamforming device 28 which in turn comprises a control unit 29 arranged to control the beamforming and the DOA estimation.

This control unit 29 is arranged to estimate the DOA that maximizes the beamforming spectrum given by $$P(\phi) = \frac{a^H(\phi)\hat{R}a(\phi)}{a^H(\phi)a(\phi)}, \quad (1)$$

where $a(\phi)$ is an antenna arrangement steering vector as a function of azimuth angle, $\phi$, and $\hat{R}$ is an estimated antenna arrangement covariance matrix. The azimuth angle $\phi$ is changed to cover the angular sector 6. The letter H denotes Hermitian, i.e. a conjugate transpose. A number of antenna arrangement steering vectors $a(\phi)$ are thus tested.

In a first example, a distance d between the antenna functions 2, 3, 4, 5 is $\lambda_L/2$, where $\lambda_L$ denotes the wavelength of the carrier with lowest frequency, here a first frequency $f_1$=700 MHz. The distance d between the antenna functions 2, 3, 4, 5 is thus half a wavelength at 700 MHz.

Figure 4:
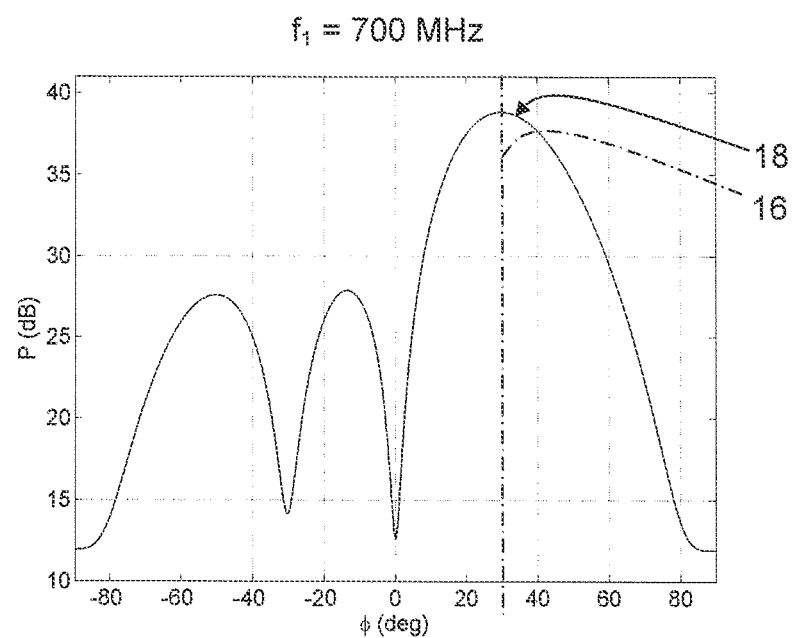
FIG. 4 shows a beamforming spectrum for a first example of an antenna arrangement at a first frequency.

FIG. 4 shows a beamforming spectrum for the first antenna arrangement 1 over the angular sector 6 in question at the first frequency $f_1$ where the first antenna arrangement 1 is relatively small measured in wavelengths, resulting in a relatively broad first frequency main lobe 18, and no grating lobes. This will give an unambiguous first DOA estimation, but the variance of these estimates will be high due to the relatively wide first frequency main lobe 18, which results in a relatively inaccurate DOA estimation accuracy.

Figure 5:
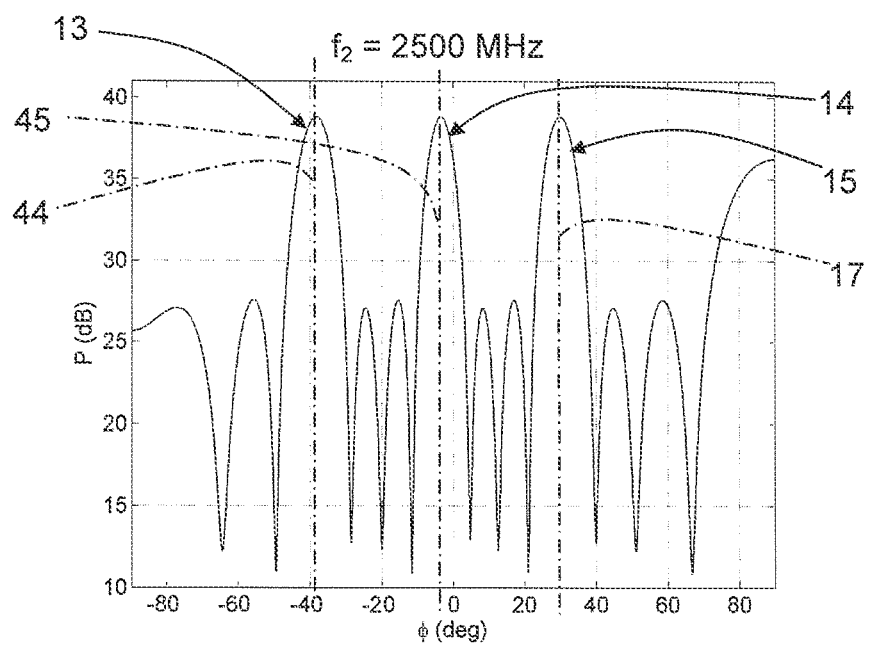
FIG. 5 shows a beamforming spectrum for a first example of an antenna arrangement at a second frequency.

According to the present invention, the first antenna arrangement 1 is arranged to perform a second DOA estimation for the transmitting device 12 at a second frequency $f_2$=2500 MHz, where the second frequency $f_2$ is of larger magnitude than the first frequency $f_1$. FIG. 5 shows an example of beamforming spectra over the angular sector 6 in question at the second frequency $f_2$, where the first antenna arrangement 1 is relatively large measured in wavelengths, resulting in a narrow second frequency main lobe 15. However, the distance between the array elements will be larger than a half-wavelength at the higher second frequency $f_2$, leading to grating lobes and ambiguous DOA estimates.

As shown in FIG. 5, two second frequency grating lobes 13, 14 are apparent in the angular sector 6 at the second frequency $f_2$. Which one of the lobes 13, 14, 15 at the second frequency $f_2$ that has the peak with the highest amplitude is determined by noise. In this context, it should be noted that a grating lobe is defined as a lobe, other than a main lobe, produced by an array antenna where the interelement spacing is sufficiently large to permit the in-phase addition of radiated fields in more than one direction.

Thus DOA estimations at the lower first frequency $f_1$ gives unambiguous but poor DOA estimates and DOA estimations at the higher second frequency $f_2$ gives ambiguous DOA estimates. Ambiguous DOA estimates are detrimental to triangulation since they increase the number of ghost targets. In accordance with the present invention, DOA estimates at a first frequency $f_1$ and a second frequency $f_2$, where the second frequency $f_2$ is of larger magnitude than the first frequency $f_1$, can be combined to yield unambiguous estimates with high accuracy.

This is possible since the first antenna arrangement 1 is arranged to separate the second frequency grating lobes 13, 14 from the second frequency main lobe 15 by means of results from the first DOA estimation. When it is clarified which lobe that is the second frequency main lobe 15, the pointing direction 17 of the second frequency main lobe 15 forms a resulting DOA estimation.

More in detail, the antenna arrangement 1 is arranged to separate the second frequency grating lobes 13, 14 from the second frequency main lobe 15 by means of comparison between, on one hand, a pointing direction 16 of the first frequency main lobe 18 and, on the other hand, a corresponding pointing direction 17; 44, 45 of the second frequency main lobe 15 and said second frequency grating lobes 13, 14, where the respective main lobes 18, 15 have the same pointing direction 16, 17. In this way, the ambiguity at the second frequency $f_2$ is removed. Since the second frequency main lobe 15 is narrower than the first frequency main lobe 18, the pointing direction 17 of the second frequency main lobe 15 is used as DOA estimation. In the example, according to FIG. 4 and FIG. 5, the DOA is approximately 30°.

The DOA estimation according above can be regarded as a number of steps:

Compute a beamforming spectrum at the first frequency $f_1$ and find the direction corresponding to the highest peak in this spectrum. Denote this direction $\hat{\phi}_L$.

Compute a beamforming spectrum at the second frequency $f_2$ and find the directions corresponding to the N highest peaks in this spectrum, where N−1 is the number of grating lobes in the beam pattern at the second frequency $f_2$ when the first antenna arrangement is steered to its maximum allowed direction. Denote these directions $\{\hat{\phi}_{H,1}, \ldots, \hat{\phi}_{H,N}\}$.

The final DOA estimate is given by the $\hat{\phi}_{H,n}$ which is closest to $\hat{\phi}_L$.

Figure 6:
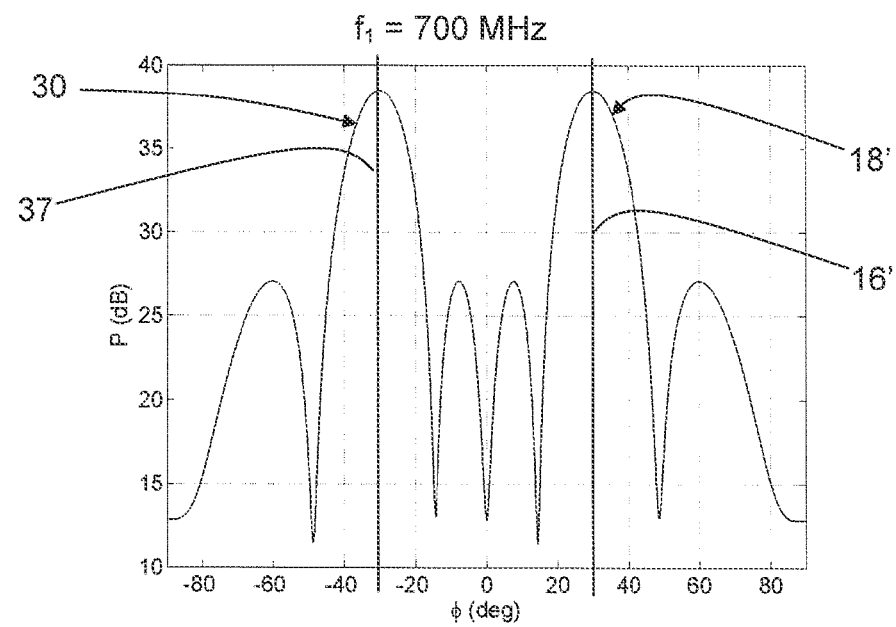
FIG. 6 shows a beamforming spectrum for a second example of an antenna arrangement at a first frequency.

According to a second example, with reference to FIG. 6 which shows a beamforming spectrum over the angular sector 6 in question at the first frequency $f_1$, the first DOA estimation results in a first frequency main lobe 18' and a first frequency grating lobe 30. This is due to the fact that the distance d between the antenna functions 2, 3, 4, 5 exceeds $\lambda_L/2$ in this case, $\lambda_L$ still denoting the wavelength of the carrier with lowest frequency, the first frequency $f_1$=700 MHz.

Figure 7:
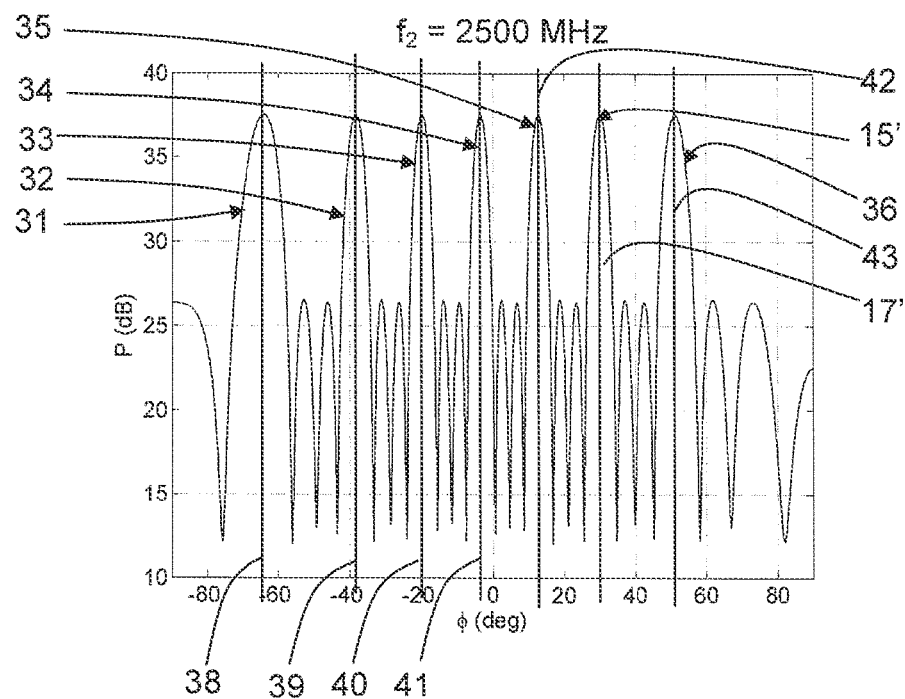
FIG. 7 shows a beamforming spectrum for a second example of an antenna arrangement at a second frequency.

Furthermore, with reference to FIG. 7 which shows a beamforming spectrum over the angular sector 6 in question at the second frequency $f_2$, the second DOA estimation results in a second frequency main lobe 15' and six second frequency grating lobes 31, 32, 33, 34, 35, 36 in the angular sector 6 at the second frequency $f_2$.

Here, grating lobes 30; 31, 32, 33, 34, 35, 36 are present for the first frequency $f_1$ as well as for the second frequency $f_2$, and it is necessary to identify which lobes that are grating lobes and which lobes that are main lobes.

The antenna arrangement 1 is arranged to separate the second frequency grating lobes 31, 32, 33, 34, 35, 36 from the second frequency main lobe 15' by comparison between, on one hand, corresponding pointing directions 16', 37 of the first frequency main lobe 18' and the first frequency grating lobe 30 and, on the other hand, corresponding pointing directions 17', 38, 39, 40, 41, 42, 43 of the second frequency main lobe 15' and the second frequency grating lobes 31, 32, 33, 34, 35, 36. The respective main lobes 18', 15' have the same pointing direction.

In this way, the main lobes of both frequencies $f_1$, $f_2$ are identified, all ambiguities being removed. As in the previous case, since the second frequency main lobe 15' is narrower than the first frequency main lobe 18', the pointing direction 17' of the second frequency main lobe 15' is used as DOA estimation. In the example, according to FIG. 6 and FIG. 7, the DOA is approximately 30°.

This means that if the first frequency $f_1$ also contains grating lobes, or if more than two frequencies are used, the ambiguous directions can in be resolved by finding the direction that is common to all frequencies. The other directions are caused by grating lobes. For some combinations of antenna function configuration and frequency bands, it is not possible to resolve the ambiguities in this case.

One example where DOA estimates are useful for communication between a base station and a user is when non-codebook based user-specific beamforming shall be applied at a base station and the channel in question is not reciprocal. The channel may be non-reciprocal due to, e.g., different downlink (DL) and uplink (UL) frequencies in a frequency domain duplexing (FDD) system. Another case where the channel is not reciprocal is if different antennas are used on the DL and UL. The DL channel will then differ from the estimated channel on the UL and thus the DL beamforming weights cannot be based on the UL instantaneous channel.

However, even if the instantaneous channel is different in DL and UL, the angles between the base station and user terminals, constituting transmitting devices 12, are reciprocal. Therefore, beamforming based on DOA estimates on the UL can be used in DL beamforming.

Another application of DOA estimation for communication purposes is to control the pointing direction of a reconfigurable antenna. Based on the directions to the user terminals, constituting transmitting devices 12, in a cell, a reconfigurable antenna can be used to focus the energy where the user terminals are in a cell-specific manner.

The basic concept of the invention is to combine sounding signals from discontinuous bands in a smart way such that the DOA estimations become more accurate.

Figure 8:
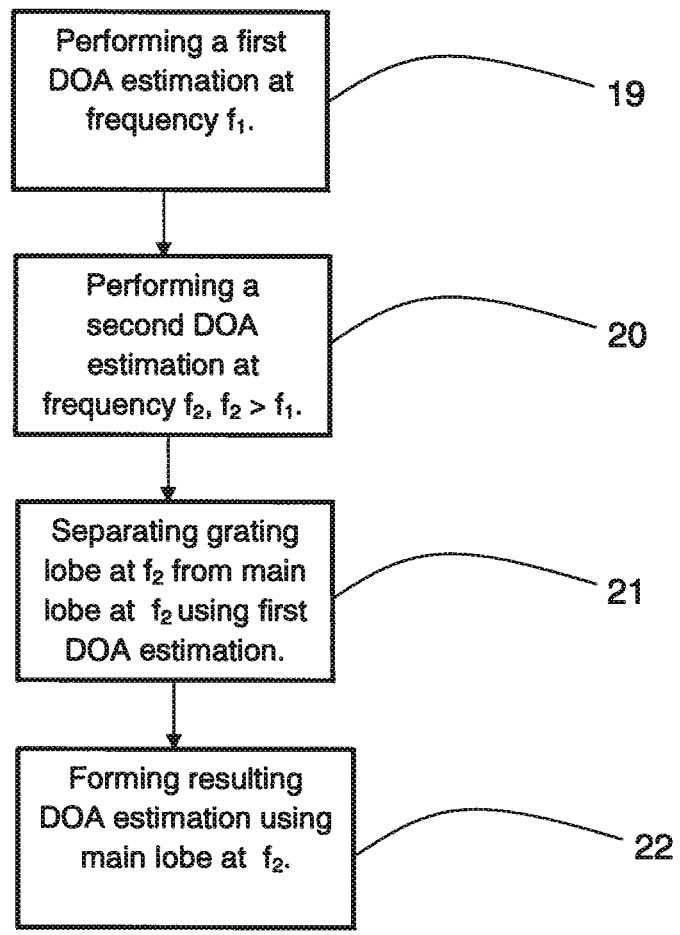
FIG. 8 shows a flowchart for a method according to the present invention.

With reference to FIG. 8, the present invention also relates to a method for estimating DOA for a transmitting device 12 the method comprising the steps:

19: performing a first DOA estimation for the transmitting device 16 at a first frequency $f_1$;

20: performing a second DOA estimation for the transmitting device 17 at a second frequency $f_2$, the second frequency $f_2$ being of larger magnitude than the first frequency $f_1$, the second DOA estimation resulting in at least one second frequency grating lobe 13, 14; 31, 32, 33, 34, 35, 36 and a second frequency main lobe 15, 15';

21: separating said second frequency grating lobe 13, 14; 31, 32, 33, 34, 35, 36 from the second frequency main lobe 15, 15' using results from the first DOA estimation; and

22: forming a resulting DOA estimation from the pointing direction (17, 17') of the second frequency main lobe (15, 15').

The present invention is not limited to the examples above, but may vary freely within the scope of the appended claims. For example, the transmitting device 12 may be a node or any type of user terminal. It may also for example be comprised by a radar device or by an interfering transmitter.

Any number of antenna arrangements 1, 24, 25 may be used for DOA estimations according to the above, each antenna arrangement 1, 24, 25 covering a certain angular sector 6, 26, 27. The antenna arrangements 1, 24, 25 are preferably similar, covering equally large angular sectors 6, 26, 27, but this is not necessary. The antenna arrangements 1, 24, 25 may be of mutually different design, comprising mutually different numbers of antenna functions and covering angular sectors 6, 26, 27 of different size.

Each antenna function 2, 3, 4, 5 may be constituted by a single antenna element or by an array of antenna elements. The number of antenna functions 2, 3, 4, 5 may vary, but each antenna arrangement 1, 24, 25 should comprise at least two antenna functions 2, 3, 4, 5. Each antenna arrangement 1, 24, 25 thus comprises an array antenna.

Where there are grating lobes, there may be any number of grating lobes. This is in dependence of the distance between the antenna functions and the frequencies used.

The present invention is of interest for DOA estimations on UL in a network node 23 such as for example a base station, a relay, or a repeater, but could in principle also be applied on the DL in a user terminal.

The present invention relates to performing DOA estimation independently at the two frequency bands, $f_1$, $f_2$, and then combine these two estimates to one final estimate. The low-accuracy DOA estimate at the first frequency band $f_1$ is used to disambiguate the high-accuracy estimate at the second frequency band $f_2$, leading to non-ambiguous estimates with high accuracy. The DOA estimation has been described using beamforming at two frequency bands, but the method can be extended to other DOA estimation methods and to more than two frequency bands.

This means that the antenna arrangement 1 may be arranged to perform further DOA estimations for the transmitting device 12 at further corresponding frequencies, each of said corresponding frequencies being of larger magnitude than the first frequency $f_1$.

The proposed method can also be used for wireless communication purposes.

The DOA may be performed in any plane such as an elevation plane, and thus not only in the described azimuth plane. It should be noted that each antenna arrangement 1, 24, 25 not only has coverage in a single plane, but in a volume.

The distances d between the antenna elements 2, 3, 4, 5 do not have to be equal for an antenna arrangement, but may vary. For an asymmetric antenna arrangement the grating lobes have differing amplitudes with respect to the main lobe.

With the term frequency, normally a carrier frequency is referred to, the signal waveforms being relatively narrow-banded around the carrier frequency.

When it is mentioned that the respective main lobes 18, 15; 18', 15' have the same pointing direction 16, 17; 16', 17', it is to be understood that the pointing directions 16, 17; 16', 17' are not exactly the same. Due to noise, calibration errors and other sources of error, there will most probably be a discrepancy. Therefore, the respective main lobes 18, 15; 18', 15' have the same pointing direction 16, 17; 16', 17' within what is practically obtainable for an antenna arrangement according to the present invention.

The invention claimed is:

1. A wireless communication system node comprising:
an antenna arrangement including at least two antenna functions arranged to cover a certain angular sector, each antenna function comprising a corresponding antenna port;
a beamforming device operatively connected to the at least two antenna functions; and
a control unit operatively connected to the beamforming unit to control beamforming and direction of arrival (DOA) estimation, the control unit being configured to:
perform a first DOA estimation for a transmitting device at a first frequency, the control unit being configured to estimate the DOA that maximizes a beamforming spectrum
perform a second DOA estimation for the transmitting device at a second frequency, the control unit being configured to estimate the DOA that maximizes a beamforming spectrum wherein the second frequency has a larger magnitude than the first frequency, and wherein at least one second frequency grating lobe is apparent in the angular sector at the second frequency,
distinguish the at least one second frequency grating lobe from a second frequency main lobe using results from the first DOA estimation, and
identify a pointing direction of the second frequency main lobe as a resulting DOA estimation.

2. The node according to claim 1,
wherein the first DOA estimation results in a first frequency main lobe having a pointing direction and the second DOA estimation results in a second frequency main lobe having a pointing direction that is the same as the pointing direction of the first frequency main lobe, and
wherein the control unit is configured to distinguish the second frequency grating lobe from the second frequency main lobe by comparing the pointing direction of the first frequency main lobe to a pointing direction of the at least one second frequency grating lobe.

3. The node according to claim 1,
wherein the first DOA estimation results in a first frequency main lobe having a pointing direction and a second DOA estimation results in a second frequency main lobe having a pointing direction that is the same as the pointing direction of the first frequency main lobe,
wherein the first DOA estimation results in at least one first frequency grating lobe, and
wherein the control unit is configured to distinguish the second frequency grating lobe from the second frequency main lobe by comparing the pointing direction of the first frequency main lobe, the pointing direction of the first frequency grating lobe, and the pointing direction of the second frequency grating lobe.

4. The node according to claim 1, wherein the control unit is configured to perform further DOA estimations for the transmitting device at further corresponding frequencies, each of said corresponding frequencies being of larger magnitude than the first frequency.

5. The node according to claim 1, comprising at least two antenna arrangements,
wherein each antenna arrangement is configured to cover a certain angular sector.

6. A method for estimating direction of arrival (DOA) for a transmitting device, the method comprising:
performing a first DOA estimation for the transmitting device by way of beamforming at a first frequency, a control unit being configured to estimate the DOA that maximizes a beamforming spectrum;
performing a second DOA estimation for the transmitting device by way of beamforming at a second frequency, a control unit being configured to estimate the DOA that maximizes a beamforming spectrum the second frequency being of larger magnitude than the first frequency, the second frequency resulting in the second frequency DOA estimation having at least one second frequency grating lobe and a second frequency main lobe;
distinguishing the at least one second frequency grating lobe from a second frequency main lobe using results from the first DOA estimation; and
identifying a pointing direction of the second frequency main lobe as a resulting DOA estimation.

7. A method according to claim 6,
wherein the first DOA estimation results in a first frequency main lobe having a pointing direction that is the same as the pointing direction of the second frequency main lobe, and
wherein separating the second frequency grating lobe from the second frequency main lobe comprises comparing a pointing direction of the first frequency main lobe, a pointing direction of the second frequency main lobe and a pointing direction of the second frequency grating lobe.

8. A method according to claim 6,
wherein the first DOA estimation results in a first frequency main lobe having a pointing direction that is the same as the pointing direction of the second frequency main lobe and at least one first frequency grating lobe,
wherein separating the second frequency grating lobe from the second frequency main lobe comprises comparing the pointing direction of the first frequency main lobe, the pointing direction of the first frequency grating lobe, the pointing direction of the second frequency main lobe, and the pointing direction of the second frequency grating lobe.

9. A method according to claim 6, further comprising:
performing further DOA estimations for the transmitting device at further corresponding frequencies, each of said corresponding frequencies being of larger magnitude than the first frequency.

10. A wireless communication system node configured to estimate a direction of arrival (DOA) for a transmitting device, the node comprising:
an antenna arrangement including at least two antenna functions;
a beamforming device operatively connected to the at least two antenna functions; and
a control unit operatively connected to the beamforming unit to control beamforming and DOA estimation, the control unit being configured to:
determine a first preliminary DOA estimation for the transmitting device, wherein the first preliminary DOA estimation is determined at a first frequency that produces a first frequency main lobe corresponding to an actual DOA for the transmitting device the control unit being configured to estimate the DOA that maximizes a beamforming spectrum, calculate a second preliminary DOA estimation for the transmitting device, wherein the second preliminary DOA estimation is determined at a second frequency that is larger in magnitude than the first frequency and that produces a second frequency main lobe corresponding to the actual DOA for the transmitting device, and at least one second frequency grating lobe, the control unit being configured to estimate the DOA that maximizes a beamforming spectrum distinguish the second frequency main lobe from the at least one second frequency grating lobe by comparing the first preliminary DOA estimation to the second preliminary DOA estimation, and identify the pointing direction of the second frequency main lobe as an actual DOA estimation.

11. A method for estimating direction of arrival (DOA) for a transmitting device, the method comprising:

producing a first preliminary DOA estimation for the transmitting device by way of beamforming at a first frequency that produces a first frequency main lobe corresponding to an actual DOA for the transmitting device, a control unit being configured to estimate the DOA that maximizes a beamforming spectrum;

producing a second preliminary DOA estimation for the transmitting device by way of beamforming at a second frequency that is larger in magnitude than the first frequency and that produces a second frequency main lobe corresponding to the actual DOA for the transmitting device and at least one second frequency grating lobe, a control unit being configured to estimate the DOA that maximizes a beamforming spectrum;

distinguishing the second frequency grating lobe from the second frequency main lobe using results from the first preliminary DOA estimation; and identifying an actual DOA estimation from the pointing direction of the second frequency main lobe.

\* \* \* \* \*

UNITED STATES PATENT AND TRADEMARK OFFICE
CERTIFICATE OF CORRECTION

| | | |
|---|---|---|
| PATENT NO. | : 8,674,879 B2 | Page 1 of 1 |
| APPLICATION NO. | : 13/453364 | |
| DATED | : March 18, 2014 | |
| INVENTOR(S) | : Nilsson et al. | |

It is certified that error appears in the above-identified patent and that said Letters Patent is hereby corrected as shown below:

In the Specification

In Column 5, Line 30, delete "can in" and insert -- can --, therefor.

In the Claims

In Column 8, Line 25, in Claim 7, delete "A" and insert -- The --, therefor.

In Column 8, Line 36, in Claim 8, delete "A" and insert -- The --, therefor.

In Column 8, Line 48, in Claim 9, delete "A" and insert -- The --, therefor.

Signed and Sealed this
Ninth Day of September, 2014

Michelle K. Lee
*Deputy Director of the United States Patent and Trademark Office*